(12) United States Patent
Zhu et al.

(10) Patent No.: US 12,556,944 B2
(45) Date of Patent: Feb. 17, 2026

(54) EDGE CLOUD PLATFORM FOR MISSION CRITICAL APPLICATIONS

(71) Applicant: Telefonaktiebolaget LM Ericsson (publ), Stockholm (SE)

(72) Inventors: Zhongwen Zhu, Saint-Laurent (CA); Qinan Qi, Saint-Laurent (CA); Claes Göran Robert Edström, Beaconsfield (CA); Tan Phat Nguyen, Montreal (CA); Alec Kurkdjian, Laval (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 18/246,672

(22) PCT Filed: Sep. 26, 2020

(86) PCT No.: PCT/IB2020/059025
§ 371 (c)(1),
(2) Date: Mar. 24, 2023

(87) PCT Pub. No.: WO2022/064258
PCT Pub. Date: Mar. 21, 2022

(65) Prior Publication Data
US 2024/0031235 A1    Jan. 25, 2024

(51) Int. Cl.
*H04W 24/02*     (2009.01)
*H04L 41/0894*   (2022.01)
(Continued)

(52) U.S. Cl.
CPC ......... *H04W 24/02* (2013.01); *H04L 41/0894* (2022.05); *H04L 41/0895* (2022.05);
(Continued)

(58) Field of Classification Search
CPC ............ H04L 41/0813; H04L 41/0866; H04L 41/0894; H04L 41/0895; H04L 41/0896;
(Continued)

(56) References Cited

U.S. PATENT DOCUMENTS 10,530,645 B2    1/2020   Yang et al.
2016/0021583 A1*  1/2016  Bansal ................ H04W 28/082
                                                          455/436
(Continued)

OTHER PUBLICATIONS

International Search Report and Written Opinion for Application No. PCT/IB2020/059025, Jun. 29, 2021, 24 pages.
(Continued)

*Primary Examiner* — Kashif Siddiqui
(74) *Attorney, Agent, or Firm* — Nicholson De Vos Webster & Elliott LLP

(57) ABSTRACT

A method implements a network slicing controller to manage network slicing instances in an edge cloud platform. The method includes receiving at least one policy change from an artificial intelligence powered smart traffic controller (APSTC) or an artificial intelligence powered edge traffic controller (APETC), determining whether the at least one policy change is valid based on local monitoring information, and sending the at least one policy change to a common control network function in a 5G mobile network.

20 Claims, 10 Drawing Sheets

(51) Int. Cl.
*H04L 41/0895* (2022.01)
*H04L 41/0896* (2022.01)
*H04L 41/16* (2022.01)
*H04L 41/40* (2022.01)
*H04L 41/5003* (2022.01)
*H04L 43/08* (2022.01)

(52) U.S. Cl.
CPC ............. *H04L 41/16* (2013.01); *H04L 41/40* (2022.05); *H04L 41/5003* (2013.01); *H04L 41/0896* (2013.01); *H04L 43/08* (2013.01)

(58) Field of Classification Search
CPC ..... H04L 41/16; H04L 41/40; H04L 41/5003; H04L 43/08; H04W 24/02; H04W 24/04
See application file for complete search history.

(56) References Cited

U.S. PATENT DOCUMENTS

| | | | |
|---|---|---|---|
| 2018/0192390 A1 | 7/2018 | Li et al. | |
| 2018/0192471 A1 | 7/2018 | Li et al. | |
| 2019/0394655 A1 | 12/2019 | Rahman et al. | |
| 2020/0044943 A1 | 2/2020 | Bor-Yaliniz et al. | |
| 2020/0196155 A1* | 6/2020 | Bogineni | H04W 48/18 |
| 2020/0304318 A1* | 9/2020 | Kravitz | H04L 9/3268 |
| 2021/0021494 A1* | 1/2021 | Yao | H04L 41/0631 |
| 2021/0022024 A1* | 1/2021 | Yao | H04W 24/08 |
| 2021/0160897 A1* | 5/2021 | Young | H04L 41/5012 |
| 2022/0417038 A1* | 12/2022 | Kravitz | H04L 63/10 |

OTHER PUBLICATIONS

3GPP TR 28.809 V0.5.0, "3rd Generation Partnership Project; Technical Specification Group Services and System Aspects; Management and orchestration; Study on enhancement of Management Data Analytics (MDA) (Release 17)," Sep. 2020, 75 pages, 3GPP Organizational Partners.

3GPP TR 28.814 V0.1.0, "3rd Generation Partnership Project; Technical Specification Group Services and System Aspects; Management and orchestration; Study on enhancements of edge computing management (Release 17)," Aug. 2020, 16 pages, 3GPP Organizational Partners.

3GPP TR 28.861 V1.1.0, "3rd Generation Partnership Project; Technical Specification Group Services and System Aspects; Telecommunication management; Study on the Self-Organizing Networks (SON) for 5G networks (Release 16)," Dec. 2019, 49 pages, 3GPP Organizational Partners.

3GPP TS 23.501 V16.5.1, "3rd Generation Partnership Project; Technical Specification Group Services and System Aspects; System architecture for the 5G System (5GS); Stage 2 (Release 16)," Aug. 2020, 440 pages, 3GPP Organizational Partners.

3GPP TS 23.502 V16.5.1, "3rd Generation Partnership Project; Technical Specification Group Services and System Aspects; Procedures for the 5G System (5GS); Stage 2 (Release 16)," Aug. 2020, 594 pages, 3GPP Organizational Partners.

3GPP TS 28.530 V16.2.0, "3rd Generation Partnership Project; Technical Specification Group Services and System Aspects; Management and orchestration; Concepts, use cases and requirements (Release 16)," Jul. 2020, 31 pages, 3GPP Organizational Partners.

3GPP TS 28.531 V16.6.0, "3rd Generation Partnership Project; Technical Specification Group Services and System Aspects; Management and orchestration; Provisioning; (Release 16)," Jul. 2020, 72 pages, 3GPP Organizational Partners.

Qi Sun et al., "Draft new Supplement 55 to ITU-T Y.3170-series (former ITU-T Y.ML-IMT2020-Use-Cases): "Machine learning in future networks including IMT-2020; use cases"—for approval," Oct. 14-25, 2019, 60 pages, SG13-TD224/PLEN, Study Group 13, International Telecommunication Union, Telecommunication Standardization Sector.

Yun Chao Hu et al., "Mobile Edge Computing A key technology towards 5G," Sep. 2015, 16 pages, First Edition, ETSI White Paper No. 11, ETSI.

Huawei, "Discussion and proposal for MEC in network slice context," Jan. 29-Feb. 2, 2018, 3 pages, 3GPP TSG SA WG5 (Telecom Management) Meeting #117, S5-181352, Rome, Italy.

Samsung, "pCR EAS Lifecycle Management," Aug. 17-28, 2020, 3 pages, 3GPP TSG-SA5 Meeting #132e, S5-204129, Online.

Samsung, "Deployment model for different Network Slice implementations," Mar. 31-Apr. 8, 2020, 3 pages, 3GPP TSG-SA WG6 Meeting #36-BIS-e, S6-200551, E-meeting.

Song Yang et al., "Survivable Task Allocation in Cloud Radio Access Networks With Mobile-Edge Computing," Jan. 15, 2021, pp. 1095-1108, IEEE Internet of Things Journal, vol. 8, No. 2, IEEE.

* cited by examiner

EDGE CLOUD PLATFORM FOR MISSION CRITICAL APPLICATIONS

CROSS-REFERENCE TO RELATED APPLICATIONS

This application is a National stage of International Application No. PCT/IB2020/059025, filed Sep. 26, 2020, which is hereby incorporated by reference.

TECHNICAL FIELD

Embodiments of the invention relate to the field of network management; and more specifically, to the improved management of network slice instances in a 5G mobile network.

BACKGROUND ART

Cellular or mobile communication networks (herein after referred to as 'mobile networks') are widely utilized communication networks that enable communication by user equipment (UE) via a wireless link with the remainder of the mobile network, other devices accessible via the mobile network, and other connected networks. Mobile networks are distributed over large geographical areas. The components of the mobile networks that interface with UE via the wireless communication are referred to as "cells," each cell including at least one fixed-location transceiver, but more normally, a set of transceivers referred to as a base transceiver station or base station. The base stations provide access to UEs within the cell to the mobile network, which can be used for transmission of voice, data, and other types of content. Mobile network operators (MNOs) develop and maintain the mobile networks and contract with subscribers to provide service to their respective UEs.

Mobile networks are based on evolving sets of technology to improve the quality of services and the throughput offered to UEs. An emerging technology is the $5^{th}$ Generation (5G) new radio (NR) technology as defined by the $3^{rd}$ generation partnership project (3GPP). The 5G mobile network includes a number of functions that can be distributed over any number and combination of electronic devices including the electronic devices of a base station, radio access network (RAN), and other devices in the 5G mobile network core. In a 5G mobile network, a UE can be connected to the 5G mobile network via the RAN including a next generation node basestation (gNodeB) and similar components of the RAN. The RAN can include any number of gNodeBs that service any number of UEs. Various functions can be distributed to partially or completely execute at gNodeBs or related components to reduce the latency between the functions and the UEs. Computing services at the gNodeB or related components can be managed as edge services or an edge cloud platform in conjunction with computing services elsewhere in the 5G mobile network.

SUMMARY

In one embodiment, a method implements a network slicing controller to manage network slicing instances in an edge cloud platform. The method includes receiving at least one policy change from an artificial intelligence powered smart traffic controller (APSTC) or an artificial intelligence powered edge traffic controller (APETC), determining whether the at least one policy change is valid based on local monitoring information, and sending the at least one policy change to a common control network function in a 5G mobile network.

In another embodiment, a network device executes the method for a network slicing controller (NSC) to manage network slicing instances in an edge cloud platform. The network device includes a non-transitory computer-readable medium having stored therein a network slicing controller, and a processor coupled to the non-transitory computer-readable medium, the processor to execute the NSC, the NSC to receive at least one policy change from an artificial intelligence powered smart traffic controller (APSTC) or an artificial intelligence powered edge traffic controller (APETC), to determine whether the at least one policy change is valid based on local monitoring information, and to send the at least one policy change to a common control network function in a 5G mobile network.

In one embodiment, a computing device executes a plurality of virtual machines, the plurality of virtual machines implementing network function virtualization (NFV), the plurality of virtual machines to execute a method for a network slicing controller to manage network slicing instances in an edge cloud platform. The computing device includes a non-transitory computer-readable medium having stored therein a network slicing controller, and a processor coupled to the non-transitory computer-readable medium, the processor to execute the plurality of virtual machines, at least one of the plurality of virtual machines to execute the NSC, the NSC to receive at least one policy change from an artificial intelligence powered smart traffic controller (APSTC) or an artificial intelligence powered edge traffic controller (APETC), to determine whether the at least one policy change is valid based on local monitoring information, and to send the at least one policy change to a common control network function in a 5G mobile network.

In one embodiment, a computing device executes a control plane of a software defined networking (SDN) network, the computing device to implement a method for an artificial intelligence powered smart traffic controller (APSTC), the APSTC to manage network slicing instances in an edge cloud platform. The computing device includes a non-transitory computer-readable medium having stored therein the APSTC, and a processor coupled to the non-transitory computer-readable medium, the processor to execute the APSTC, the APSTC to determine at least one policy change for managing network slicing instances in an edge computing platform (ECP) based on collected network metrics and an artificial intelligence or machine learning model, the APSTC to send the at least one policy change to a network slicing controller (NSC), and to collect updated network metrics from an ECP edge data center implementing the NSC and the at least one policy change.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
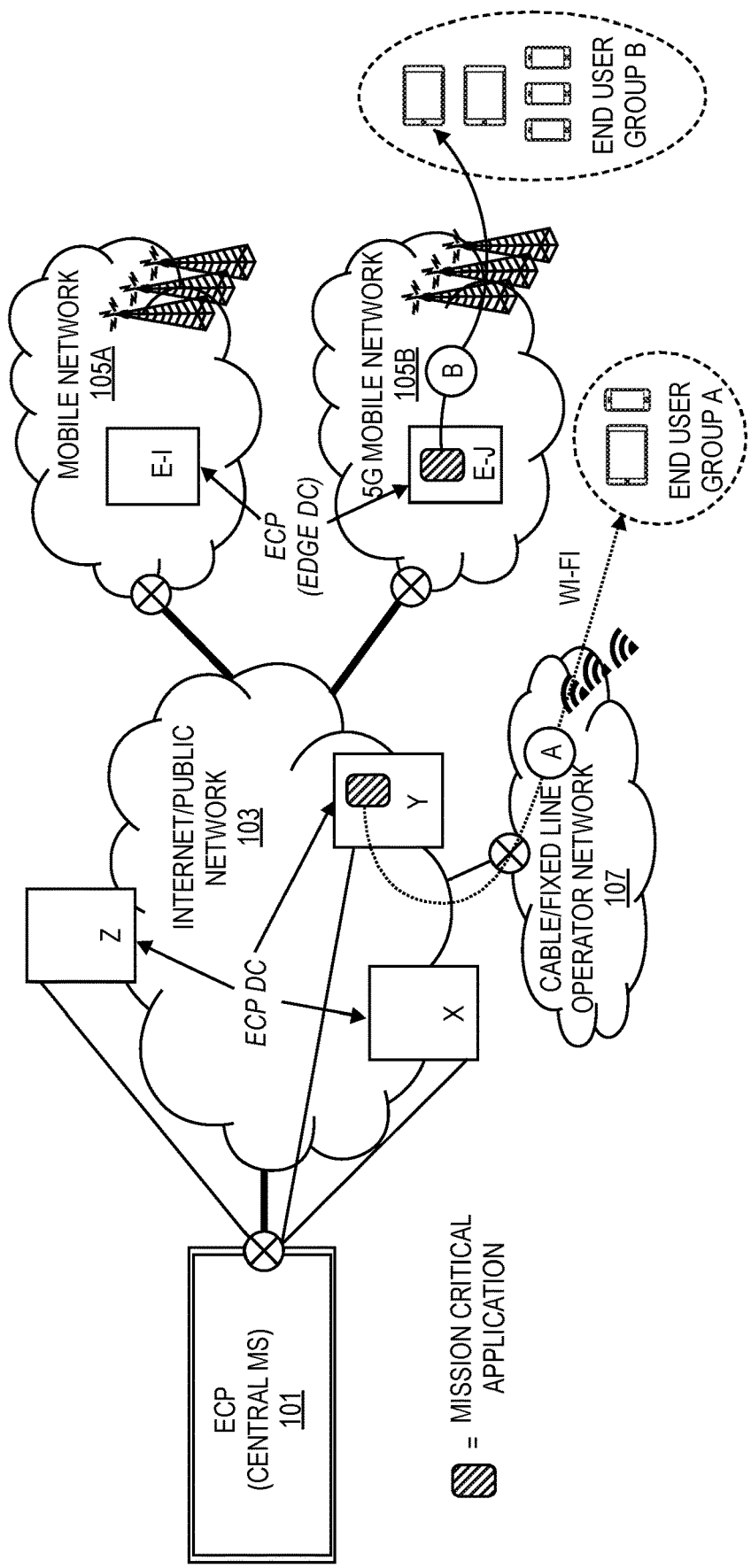
FIG. 1 is a diagram of one example embodiment of a public network connecting a set of mobile networks with a central management station.

The following description describes methods and apparatus for network slicing instance management in networks that combine mobile networks (5G networks) and edge cloud networks. The embodiments provide improved processes for the operation of a network slicing controller (NSC), artificial intelligence powered smart traffic controller (APSTC), artificial intelligence powered edge traffic controller (APETC), and similar components in a 5G mobile network and associated computing platforms to improve usage of computing resources across an edge computing platform (ECP) while minimizing latency for services provided by the ECP. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments provide improved operation for 5G mobile networks. In 5G mobile network technology, a concept of network slice instance is introduced. In the embodiments, a 5G mobile network technology provides a framework to set up and manage the network slice entity, which makes a reservation of computing resources on computing devices including network devices to have a guaranteed network performance from the 5G mobile network core to user equipment (UE) (i.e., mobile devices), where the performance encompasses guaranteed metrics such as latency and throughput. For a mission critical or latency sensitive application, the information or instructions provided by applications or services are to be delivered to UE (i.e., mobile devices) as quickly as possible. The end to end latency from an application or service to an end user device (UE) is expected to be at the millisecond level.

In the current cloud platform architectures (e.g., such as those provided by Amazon Web Services (AWS), Google Cloud Platform (GCP), Microsoft Azure or similar cloud platforms) a service producer can deploy its applications in the data center (e.g., such as using virtual machines (VM), kubernetes (K8s) or similar technology) and provide its services towards its subscribers/end users through the 5G mobile network.

However, current cloud platform architectures have several existing problems. Since the connection between the data center and mobile networks goes through public/Internet networks, it is a 'best effort' for the involved networks to deliver a mission critical application/service to end users in terms of end-to-end latency. This means that there is no guarantee for the end-to-end latency between the application/services and the UEs that are required by the mission critical application/service. How to address this latency issue is a challenging problem. One approach to mitigate this problem is to get rid of public/Internet networks in the delivery path. This approach is referred to as an "Edge Cloud Platform,", which is directly deployed as a distributed data center inside a mobile network in order to reduce the latency between the data center and the 5G mobile core network (5G CN).

The architecture of the application/service delivery is provided through a mobile network operator. Within 5G mobile networks, there are two major components, 5G Core Network (5G CN) and 5G Radio Access Network (5G RAN). A 3GPP management system can set up the policies in those two components, eventually applying the policies on the traffic nodes (TN) which route the data traffic on the data plane of the mobile network. However, this simple integration between the data center and 5G mobile network is not flexible or sufficient to meet the demand from multiple mission critical or latency sensitive applications or services deployed in the data center or ECP. In particular, the current art is not able to utilize 5G mobile network resources efficiently. For instance, it might over-allocate the network resources to deliver a mission critical service to single or multiple targeted end user groups at the beginning. But it cannot be adjusted based on the real data traffic from end users.

The embodiments overcome the limitations of the art to provide efficient network usage for multiple mission critical applications in a 5G mobile network.

FIG. 1 is a diagram of one example embodiment of a public network connecting a set of mobile networks with a central management station. The diagram illustrates the components of an ECP including a public network. The example ECP and network is provided by way of example and not limitation. One skilled in the art would appreciate that the network and ECP can encompass additional features, mobile networks, and components. Many elements are omitted for sake of clarity and conciseness.

In the example embodiment, a ECP central management system (MS) manages both a centralized datacenter (DC) (i.e., an ECP DC) and the associated computing resources, as well as a set of ECP edge DCs and the associated computing resources. The computing resources (x, y, z) of the ECP DC are deployed adjacent to a public network (e.g., Internet) 103, where the computing resources can be any number and combination of processing and storage resources in communication with the public network 103 and a central ECP MS 101. A 'set,' as used herein refers to any positive whole number of items including one item.

The ECP edge DC and related resources are deployed within a service provider (SP) network. Examples of SP networks include mobile networks 105A and 105B, as well as, cable, fixed line, and similar networks 107. These SP networks can include data center resources including servers on which one or multiple mission critical applications are deployed. These computing resources can include servers, network devices, and similar computing resources. Any number and variety of computing resources can be deployed as part of the ECP across the public network 103, SP networks, and similar locations.

An application deployed in the ECP DC footprint (e.g., application Y) provides a service to an end user group A through an associated Internet and Cable/fixed line operator network 107. For example, the group of end user devices A can access the SP network 107 via Wi-Fi access following path (A). The same application can be deployed in the ECP edge DC footprint (e.g., at E-J) provides the service to end user group B through 5G mobile network 105B by following path (B).

Figure 2:
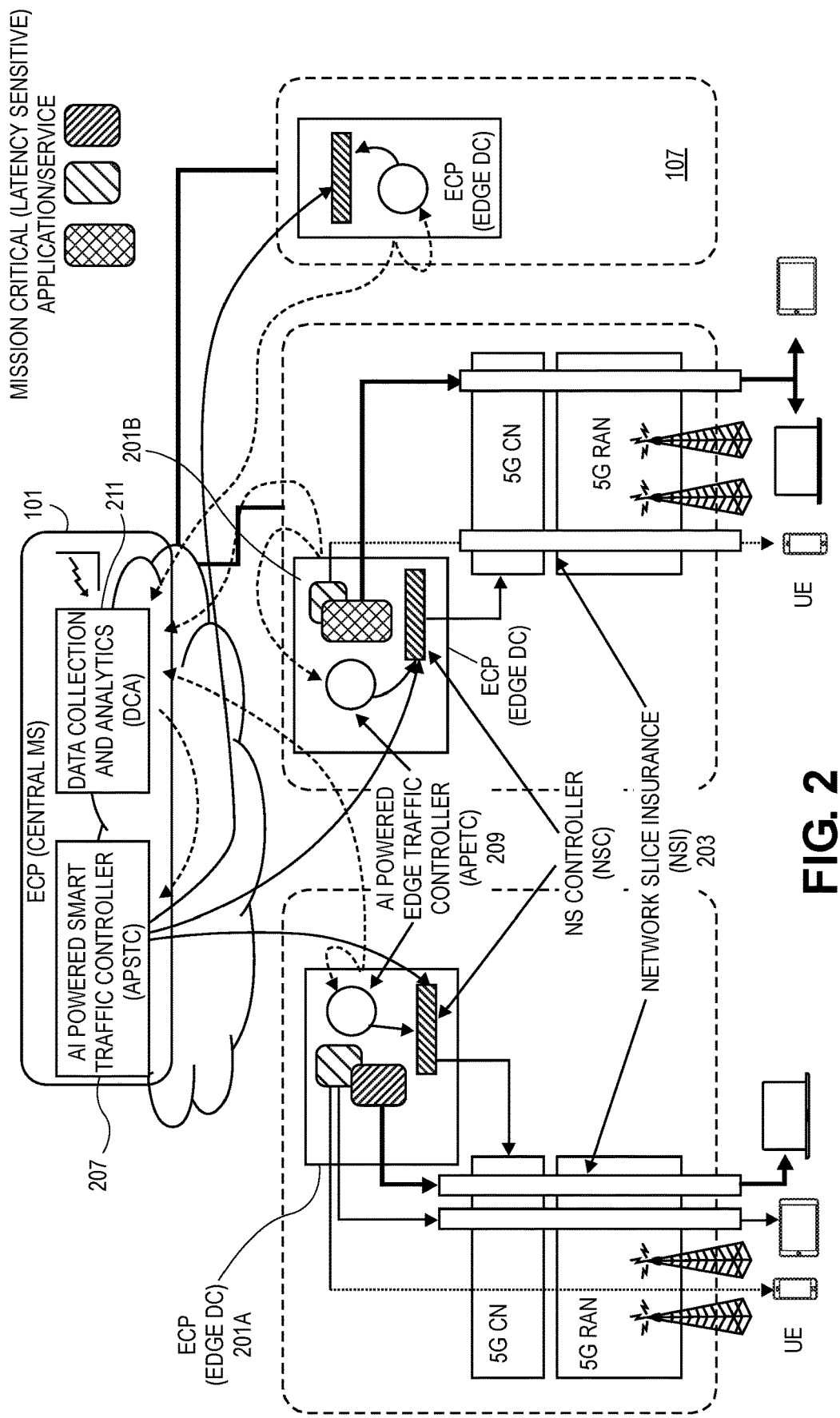
FIG. 2 is a diagram of one example embodiment of functions in a set of mobile networks that support network slice instances.

FIG. 2 is a diagram of one example embodiment of functions in a set of mobile networks that support network slice instances. The diagram of FIG. 2 provides additional detail of the operations in SP networks (e.g., 105A and 105B) as well as at the ECP MS 101. The additional detail of this view of the network introduces a Network Slicing Controller (NSC) 201A 201B in the ECP edge DC, which can update the policy for the network slice instances (NSIs) 203 deployed in the example 5G mobile networks 105A and 105B. The policies to be promulgated to the NSIs 203 can based on the traffic pattern predicated by artificial intelligence/machine learning (AI/ML) powered models. The AI/ML models can be trained by using network traffic samples collected from ECP edge DC resources as well as metrics collected at the ECP DC. The ECP DC is not shown in FIG. 2 for simplicity, to focus on 5G mobile network integration with ECP.

An APETC (AI Powered Edge Traffic Controller) 209 and APSTC (AI Powered Smart Traffic Controller) 207 are involved in managing traffic policies for NSIs 203. The APETC 209 and APSTC 207 can be any AI or ML driven management systems for analyzing network metrics and deriving optimized network policies for traffic management. The APETC 209 is deployed in the ECP edge DC (i.e., in the footprint of an SP network such as mobile networks 105A and 105B). The APETC 209 provides "real time traffic prediction" based on the monitoring of the corresponding traffic related to single or multiple latency sensitive applications. The APETC 209 provides the instructions to the NSC 201A and 201B to create/update/delete the corresponding policy for NSI in the 5G mobile network if required.

The APSTC 207 controls components in ECP central MS 101. The APSTC 207 collects network traffic information not only from a single SP network, but also can aggregate network traffic information from multiple SP networks (e.g., in a same region or globally). The APSTC 207 also collects the network traffic information from the ECP DC footprints, which can be deployed around the world but attached to the Internet or similar public network. The traffic data and metrics can be collected at the ECP MS 101 by a data collection and analytics (DCA) component 211. An AI/ML algorithm, such as Time Series Deep Learning Algorithm, such as recurrent neural network (RNN), transformer, long short term memory (LSTM), Reinforcement learning algorithm, or other machine learning or similar new technology, can be used to optimize the overall traffic routing across different networks, locations and regions.

In cases where traffic optimization is required at specific SP networks or at a specific location within the SP network, the corresponding NSC 201A, 201B in the ECP edge DC is notified about the update from the central MS 101 (e.g., originating at the APSTC 207 in some embodiments). The updated configuration for NSI policy is delivered to the NSC 201A, 201B by the respective APETC 209. The NSC 201A, 201B, then creates/updates/deletes the policies for the NSIs 203 under its respective management in the 5G mobile network 105A, 105B, such as policies that adjust latency or throughput of services provided by NSI 203. Eventually, the SP 5G network management system will create/update/delete the resource allocations according to the updated policies.

The improved ECP management of the embodiments, provides a variety of advantages over the art. The embodiments provide a smart mechanism to deploy mission critical applications in SP networks (e.g., 5G mobile networks). The embodiments utilize 5G mobile networks more efficiently through introduction and improved management of 5G network slicing technology. The improvements of the embodiments can attract more ECP tenants (application developers offering services via NSIs) to boost the revenue for mobile network operators. This in turn will increase the sale of 5G mobile network components including those that directly support the embodiments.

The embodiments also provide an alternative for 5G mobile network operators to benefit from the network slicing model implemented in 5G network infrastructures. The network operators can recover investments in 5G infrastructure and make a profit with a greater number of services being hosted by the ECP. End users also benefit from the proposed solution to have good user experiences and reliable service with lower latencies and improved throughput.

The example embodiments of FIG. 2 further show three example SP networks and relevant components. Each of the SP networks including 5G mobile networks 105A and 105B, as well as fixed network 107 include ECP edge DC computing resources. These can be housed in a single location or distributed over a corresponding geographic area. The 5G mobile networks each include a 5G core network (CN), and a set of 5G radio access networks (RANs). The user equipment and associated end users connect to the respective 5G mobile network via local cells or base stations that can include ECP edge components. The set of 5G RANs in a mobile network connect with their respective 5G CN.

Network slice instances can utilize resources distributed across any combination of the 5G CN and the set of 5G RANs for each 5G mobile network. The network slice instances enable the use and combination of virtualized functions and independent logical networks on a single or shared physical network infrastructure. Each network slice instance can function as a separate or independent end-to-end network tailored to fulfil the requirements requested by a particular application.

For this reason, network slice instancing technology can play a central role to support 5G mobile networks that are designed to efficiently embrace a plethora of services with very different service level requirements (SLR). The realization of network slicing instancing leverages the concepts of software defined networking (SDN) and network function virtualization (NFV) that allow the implementation of flexible and scalable network slice instances on top of a common network infrastructure.

Figure 3:
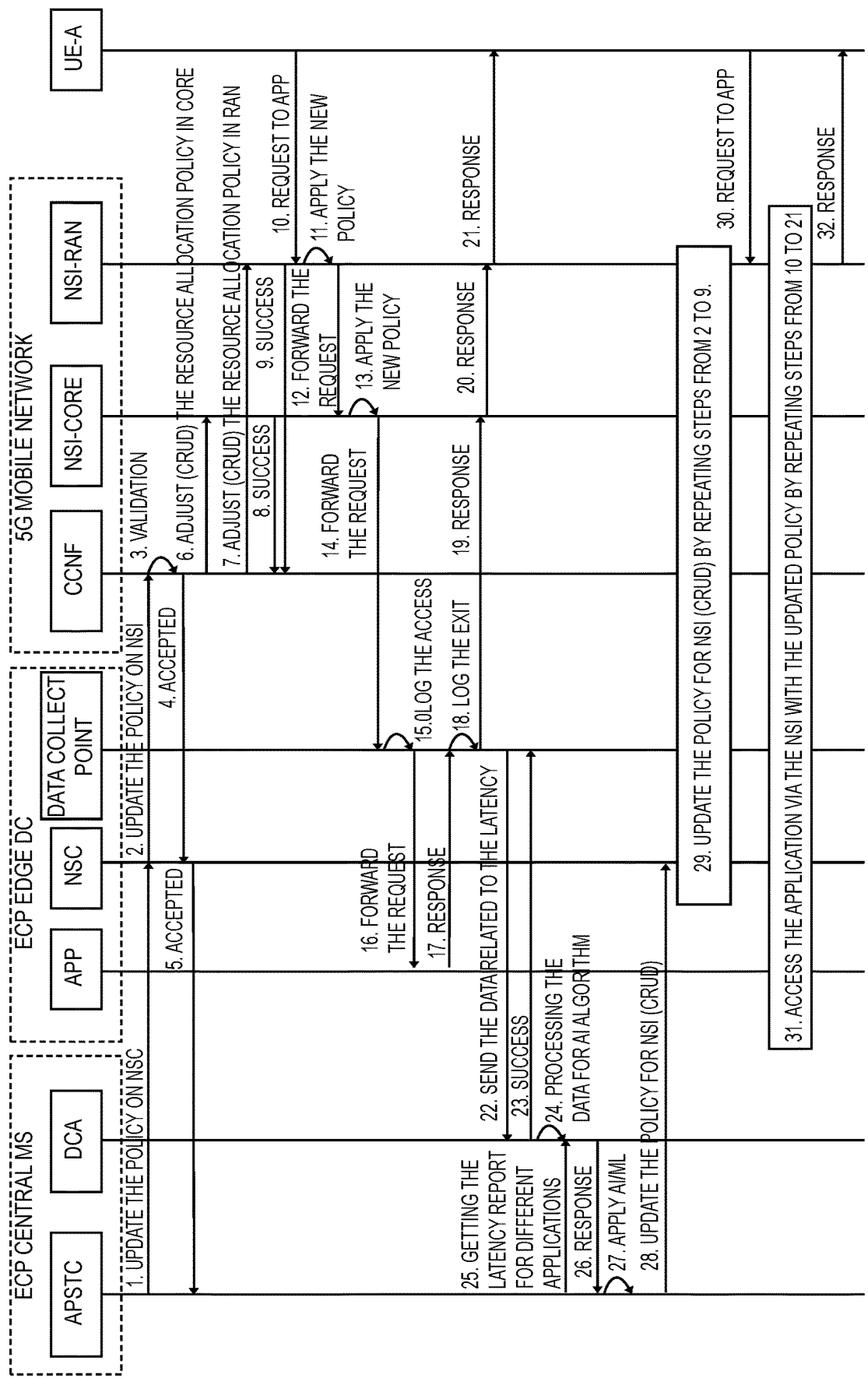
FIG. 3 is a timing diagram of one embodiment of the operations to support artificial intelligence powered smart traffic controller (APSTC) management of NSIs.

FIG. 3 is a timing diagram of one embodiment of the operations to support artificial intelligence powered smart traffic controller (APSTC) management of NSIs. The flow of NSI policy updates via an APSTC in ECP central MS is illustrated. A general flow of how the APSTC operates to manage the implementation of network traffic policies in a 5G mobile network is illustrated. The process works with NSI in 5G mobile network policies initiating with the APSTC and being distributed to NSI via an NSC at the ECP edge DC platform.

The process can be initiated by an APST based on predictions of traffic pattern made by an AI/ML process such that the APSTC decides to send (1) an update toward the NSC in an ECP edge DC. The policy can be sent as a request for an NSC update (i.e., a create, read, update, delete (CRUD)). The NSC receives the request from the APSTC. This leads to an update of the NSI policy (e.g., to increase bandwidth or reduce the bandwidth). The NSC sends (2) the updated policy to a common control network function (CCNF) in the 5G mobile network. Although in the illustrated example, an update operation is shown, the process also supports and applies to other CRUD operations.

The 5G CCNF does a validation on the request received from the NSC that is deployed in the ECP edge DC associated with the 5G mobile network of the CCNF (3). The CCNF can accept a validated request. The 5G CCNF then sends the acceptance confirmation, e.g. a 201 Accepted, back to the NSC in the ECP edge DC (4). In cases where the policy or CRUD is not validated, then an error or similar indicator can be returned (not shown). The NSC in the ECP edge DC sends the confirmation, e.g. 201 Accepted, back to APSTC (5).

The 5G CCNF adjusts the network resource for the NSI in the 5G network core (6) according to the CRUD. The 5G CCNF adjusts the network resource for NSI in 5G RAN (7) according to the CRUD. The NSI-Core sends a confirmation back to 5G CCNF (8). Similarly, the NSI-RAN sends a confirmation back to 5G CCNF (9).

When a given user equipment (e.g., UE-A) sends a request to the application deployed in ECP edge DC through NSI-RAN (10) to access the functions and data of the application, the updated policies for the application associated with the NSI are applied (11). The NSI-RAN forwards the request toward the application associated with the NSI to the 5G core (12). The 5G core similarly applies the updated policies for the application and associated NSI while the request is being serviced (13). The request can be processed by the data collection point and logged (e.g., an access of the application services by the UE is logged) (15). The request is forwarded to the application to be serviced (16). The application services the requests and sends a response back to the data collection point (17) to be logged (e.g., the results from the application) (18), before the response is sent back to the UE via the 5G network core (19), 5G RAN (20), to end with the UE (21).

As a response from the application is forwarded to the UE, the data collection point sends network metrics derived from collected data related to the communication between the application and the UE to the data collection and analysis component of the ECP MS (22). The data collection and analysis component acknowledges the received data (23). The data received from the ECP edge DC at the ECP central MS can be segregated based on the network operator of the associated 5G mobile network to maintain proprietary data for each SP network. In other embodiments, the collected data can be anonymized at the respective ECP edge DCs before being provided to the data collection and analysis component (DCA) to enable greater data availability on network conditions affecting policy decisions while maintaining control of proprietary data at the SP network or similar entity. The anonymized data at the DCA can be made available to the ECP central MS for further analysis. The collected data at the DCA component can be processed to identify changes in network conditions that affect applications executing in the ECP edge DC or to organize the data as training samples for the APSTC (24). In this manner, the APSTC is able to perform a global analysis of data in the networks that it manages while keeping proprietary data in the respective SP networks. In the illustrated example, the detected conditions are primarily related to latency.

The APSTC further analyzes the results of the compilation of collected data (e.g., receiving a latency report for an application) for applications operating in the ECP edge DCs (25). Based on the received results (26), the APSTC decides whether adjustments to resource allotments and utilization in the ECP edge DC and 5G mobile network supporting network slice instances are needed (26). The determination of updates to the policies can be made by application of any AI/ML algorithm. The APSTC can apply the AI/ML algorithm to train a model using retrieved data samples from the DCA to build an updated prediction model. If the APSTC determines that a policy update is needed, then the process repeats the previously discussed steps to send the updated policy for NSI (CRUD) (28) as an iterative process to continually adjust the NSI policies at the NSC and 5G mobile network to balance resources for NSI optimally (29-32).

In some embodiments, a single policy is set up for one application. In some embodiments, one policy can be applied to different applications. If the same latency requirements are present for multiple applications, these applications can have a shared policy. The applications with a shared policy can be provided by single application provider or different application providers.

In embodiments where shared policies are utilized, referred to as "coordination operations," these coordination operations are recorded in the dataset, which can also be used to train the AI/ML model of the APSTC. Over time the model improves the intelligence and optimization for the coordination operations to work more efficiently.

For instance, two gaming applications can be deployed in the ECP. One gaming application is provided by company A, the other by company B. Based on the prediction of the incoming traffic, the ECP central MS deploys gaming application A in Toronto and Montreal, and gaming application B in Montreal and New York. Since the A and B gaming applications are both serving at Montreal, a common policy can be used for both A and B gaming applications. The AI/ML model can create the common NSI policy for Rogers 5G network based on the anonymized data from the edge cloud in Montreal.

The AI/ML model builds the connections between A and B gaming by training the model using the experience for doing the policy combination in the past, then apply these "experience" for the similar coordination required in the future encountered traffic pattern.

The number of targeted SP networks managed by the ECP central MS can vary over time. The selection of targeted SP networks is made based on the predicted traffic pattern from AI/ML trained model. The pool of SP networks and ECP DC footprints is dynamically formed based on pre-configurable criteria, such as regions or locations. It can also be completely based on AI/ML traffic prediction model.

Figure 4:
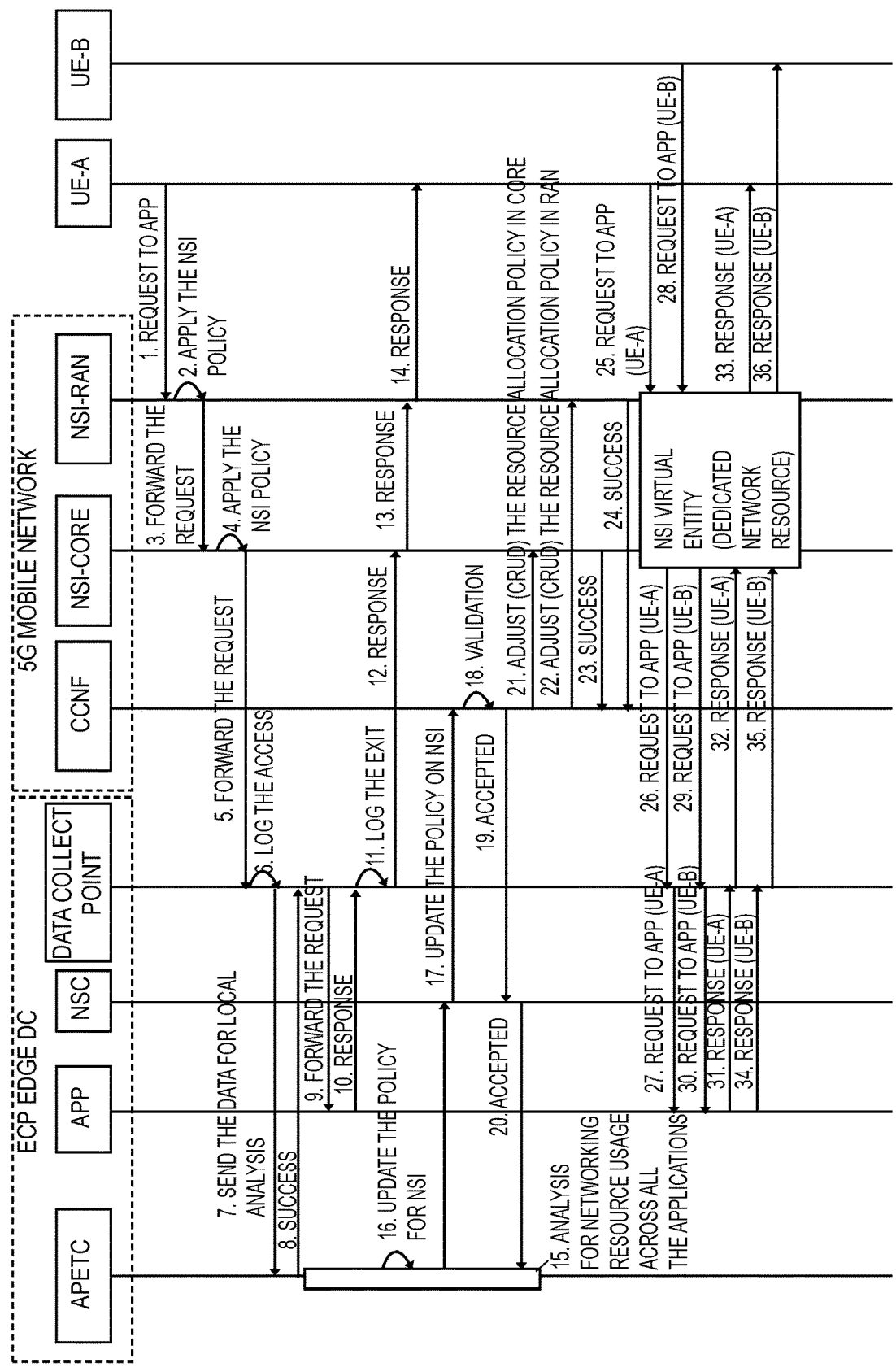
FIG. 4 is a flowchart of one embodiment of the operations to support artificial intelligence powered edge traffic controller (APETC) management of NSIs.

FIG. 4 is a flowchart of one embodiment of the operations to support artificial intelligence powered edge traffic controller (APETC) management of NSIs. In this embodiment, the APETC manages policy adjustments for network slice instances. In the illustrated example, the process can be response to UE requests. In the illustrated example, UE-A sends a request to an application that is deployed in ECP edge DC (1). The network slice instance at the RAN applies the current traffic management policy for the request to application (2). The network slice instance at the RAN forwards the request to the network slice instance for the application in the 5G mobile network core (3).

The network slice instance in the 5G mobile network core applies the current traffic management policies for the request to the application. The network slice instance in the 5G mobile network core forwards the request to data collect point at the ECP edge DC (5). The data collect point logs the access information (6). The data collect point sends the data for local analysis to the APETC (7). The APETC sends a confirmation back to data collect point (8) indicating the data has been received successfully.

The data collect point forwards the request from the UE to the correlated application deployed in the ECP edge DC (9). The application processes the request and sends a response back to the data collect point (10). The data collect point logs the result of the application (i.e., the exit) (11). The data collect point sends the application response back to network slice instance in the 5G mobile network core (12). The network slice instance in the 5G mobile network core sends the response to the network slice instance in the RAN (13). The network slice instance in the RAN sends the response back to UE (e.g., UE-A) (14).

The APETC does analysis for networking resource usage across different applications deployed in the ECP edge DC (15). The APETC sends a request to the NSC to update the policy for the NSIs in the 5G mobile network based on the outcome of the analysis (16). The NSCs send the request to CCNF to update the policy for a given NSI in the 5G mobile network (17). The CCNF does a validation on the request from the NSC (18). The CCNF sends the confirmation back to NSC (19). The NSC sends the confirmation back to APETC (20).

In addition, the CCNF sends the request to NSI in the 5G mobile network core to update the policies for the NSI (CRUD) (21). The CCNF sends a request to the NSI in the RAN to update the policy for the NSI (22). The NSI in the 5G mobile network core sends a confirmation back to the CCNF (23). The NSI in the RAN sends the confirmation back to CCNF (24).

In this example, both UE-A and UE-B send requests to the application via updated NSI (referring to steps 25 to 36) to illustrate that the updated policies can be applied to a variety of UEs making requests to the same application. Any number of UEs can be serviced and the policies determined by the APETC can be applied to all similarly situated UEs. It is also possible that the APETC can act in a continuous iterative process to update policies for resource management for NSIs by re-executing the equivalent to steps 7-22.

In this example, the update operation is used by way of illustration, the process also supports all CRUD operations.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 5:
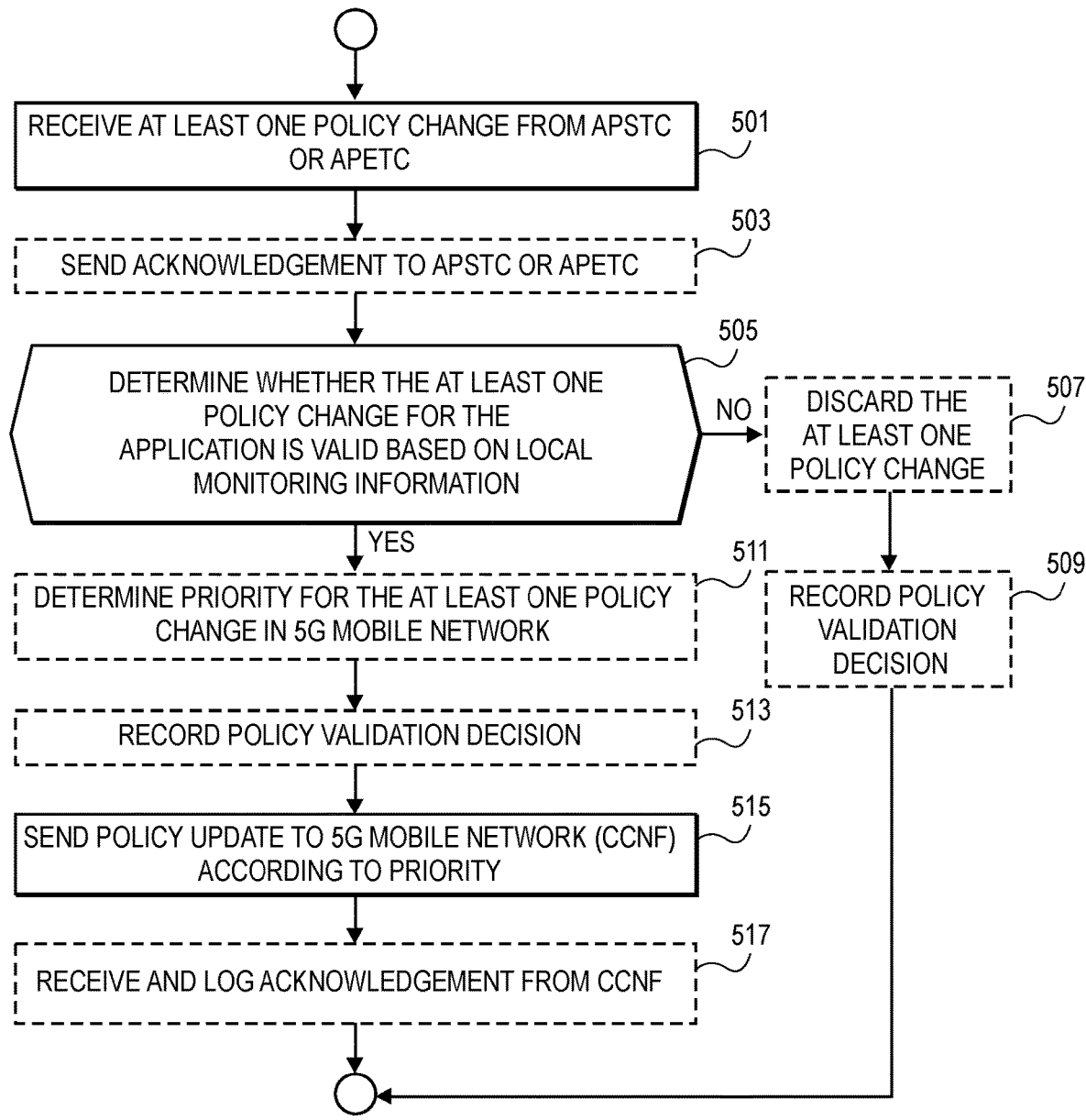
FIG. 5 is a flowchart of one embodiment of the operations of a network slicing controller (NSC).

FIG. 5 is a flowchart of one embodiment of the operations of a network slicing controller (NSC). The operation of the NSC is provided by way of example and not limitation. One skilled in the art would understand that the functions described as being performed by the NSC can be performed by other components and that the NSC performs other operations not described with relation to the illustration. The NSC can initiate the process in response to receiving a policy change (CRUD) from an APSTC or APETC either directly or indirectly using any message format and communication medium (Block 501). The policy information can specify changes to NSI resource allocation in a 5G mobile network and/or at an ECP edge DC for any number and combination of applications with NSIs in an service provider network managed by the NSC. In the examples, discussion of a single set of policy changes for a given application is used by way of example. However, the set of policy changes can apply to multiple applications and NSIs managed by the NSC at an ECP edge DC. In some embodiments, the different applications are only viewed at the EPC central MS level where the application developers sign service level agreement (SLA) with the edge cloud instead of SP. In this case, they look like the same in the view of SP network (e.g., 5G mobile service provider). In response to receiving the policy changes, the NSC sends an acknowledgement to the APSTC and/or APETC that originated the policy changes.

The NSC examines the updated policy changes to determine whether the policy changes for applications and NSIs managed by the NSC are valid based on local monitoring information (Block 505). For example, the NSC can confirm that the associated applications are still running at the ECP edge DC and/or using the NSIs in the 5G mobile network. If the policy changes are not valid, then the policy changes can be discarded (Block 507). In some embodiments, the NSC validation or a separate function can identify whether receive policy changes from the APSTC conflict with local policies set by an APETC or similar local management. Depending on the configuration the local policies can supersede or be superseded by the policy changes of the APSTC. Similarly, the updates of the APSTC can be out of date or already implemented local such that they are redundant. The NSC evaluates and decides which policy changes to implement or validate. The policy change update decision is logged locally at the ECP edge DC (e.g., in the data collection point) (Block 509). The process then completes and the NSC awaits further policy updates from the APSTC or APETC.

If the updated policy changes are validated, then the NSC determines a priority for the policy change (Block 511). The priority can be determined based on assessment of how the policy is utilized by applications of the ECP edge DC and mobile network. Policies that have a heavy usage or effect on applications are given a higher priority. The policy update and priority information are recorded (e.g., by the data collection point) (Block 513). The set of policies are then sent to the CCNF to be implemented by the 5G mobile network in priority order (Block 515). Any number of policies affecting any number of NSIs and applications can be processed as a group or 'batch' where the prioritization affects the order of implementation. The CCNF response to acknowledge receipt of the policy updates, which is logged (e.g., via the data collection point) (Block 515). The NSC then awaits further policy updates from the APSTC or APETC.

Figure 6:
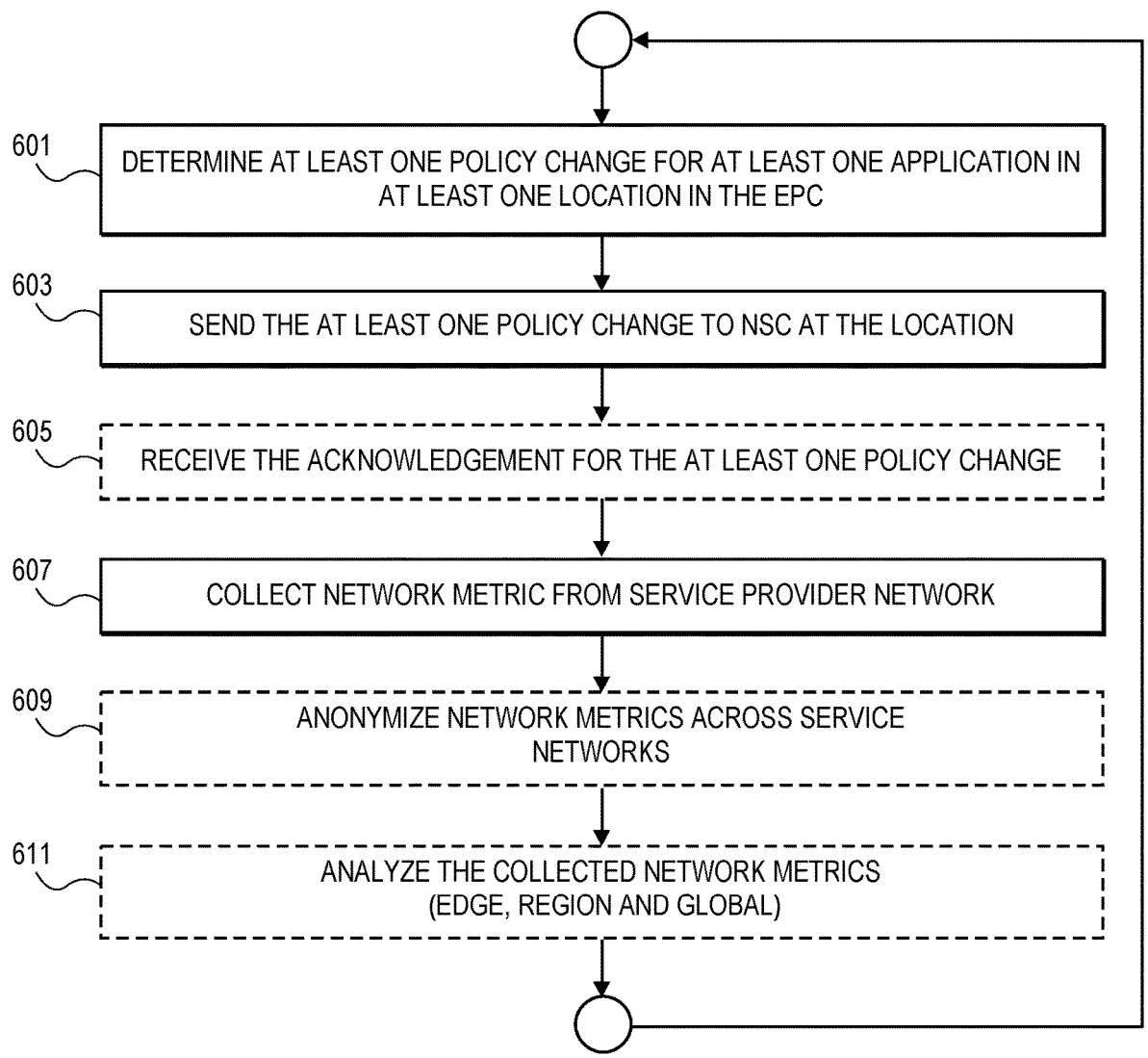
FIG. 6 is a flowchart of one embodiment of the operations of an APSTC.

FIG. 6 is a flowchart of one embodiment of the operations of an APSTC. In embodiments where the APSTC is managing NSIs across an ECP, the flowchart provides an example where policy updates are determined and sent to NSCs at ECP edge DCs for implementation. Examples describe policy updates for a single NSC or ECP edge DC, however, one skilled in the art would understand that a set of NSCs and/or ECP edge DCs can be managed as a group, based on separate SP networks, based on different locations, globally or in similar configurations. Data collected from different SP networks can be segregated for security or for protection of proprietary interests. In some embodiments, data is anonymized to enable some degree of indirect sharing of information across SP networks.

An APSTC can continuously evaluate available network metrics to determine at least one policy decision for at least one application in at least one location in the ECP (Block 601). The policy can be determined by any AI or ML algorithm or combination thereof. The set of policies determined can be for any number of applications, NSCs, NSIs, ECP edge DCs, or similar components that support applications and their services in an ECP. For each policy that is updated based on the AI or ML model that is generated by the APSTC, a set of policy changes are sent to the corresponding NSC (Block 603). The APSTC receives an acknowledgement from each NSC that the policy updates have been received (Block 605). If an acknowledgement is not received, the policy updates may be resent in some embodiments.

The APSTC in coordination with the DCA can continuously collect and receive network metrics (e.g., key performance indicators (KPIs)) from NSCs at various ECP edge DCs (Block 607). The received network metric information may be proprietary and can be separately maintained for each SP network. In some embodiments, a copy of the received network metrics can be anonymized by removing service provider, UE, subscriber or similar information. In other embodiments, the data is anonymized at the EPC edge DC, before being provided to the DCA. The anonymized data can be aggregated across SP networks to provide an improved, more detailed, and up to date data set for training and modeling the applicable AI/ML of the APSTC (Block 609). The aggregated data can then be analyzed to prepare a model for further updated policy changes (Block 611). The data can be aggregated at differing levels and scope and models for these different scopes can be generated. The data and scope of the data collection can include any one or more of an ECP edge DC, region, global, SP network, or similar scope. The embodiments also support policy update (distribution) for single or multiple applications across different locations in the ECP. The embodiments further support combining or merging the policy distribution for different applications at same location or different locations in the EPC. Similarly, the embodiments support removing or splitting the common policy for different applications at the same location or different locations. These actions can be managed by the APSTC or similar components.

Figure 7:
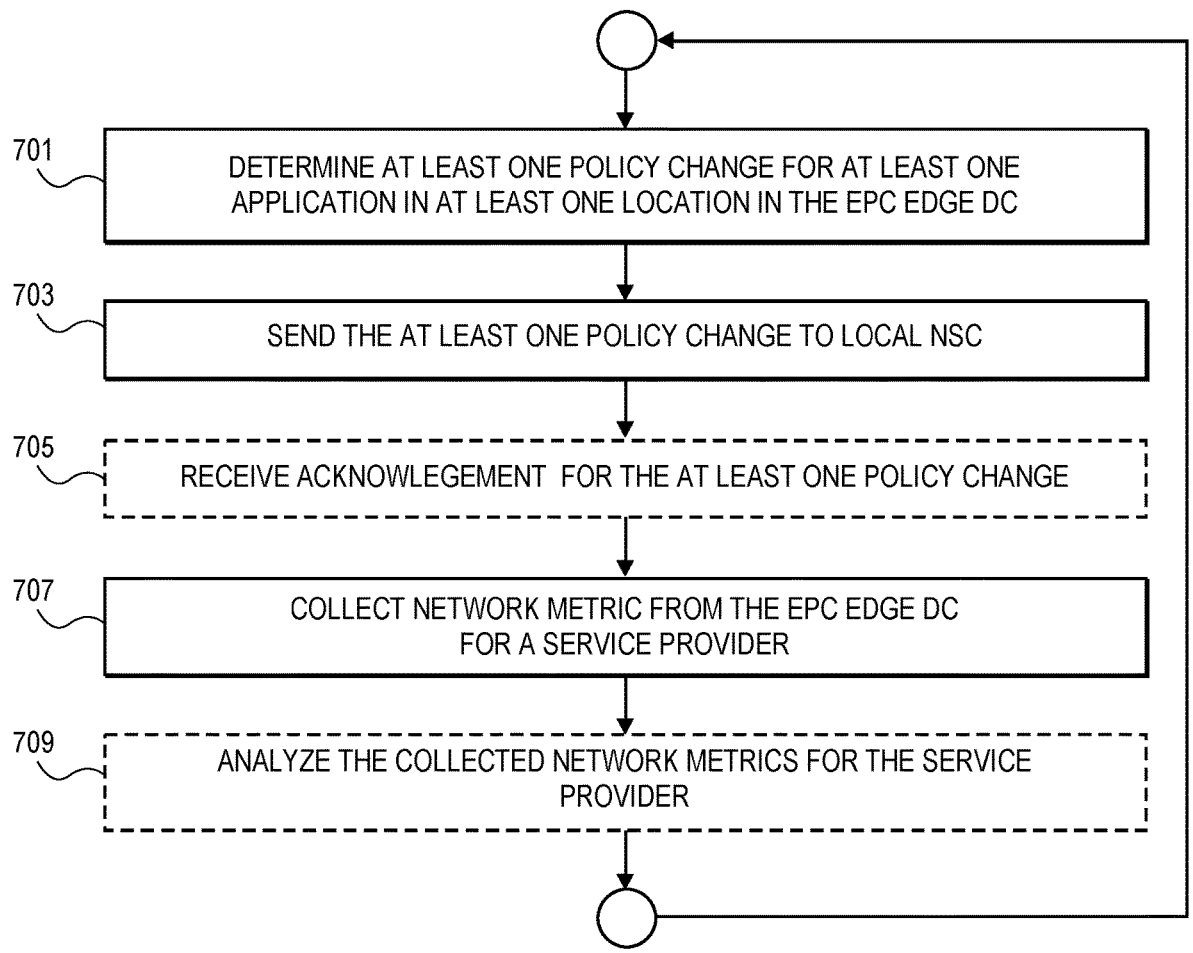
FIG. 7 is a flowchart of one embodiment of the operations of an APETC.

FIG. 7 is a flowchart of one embodiment of the operations of an APETC. In this example, the APETC operates to update policies local to an ECP edge DC, and/or SP network. Examples describe policy updates for a single NSC or ECP edge DC, however, one skilled in the art would understand that a set of NSCs at an ECP edge DC can be managed as a group, based on different locations, associated NSIs, or in similar configurations. An APETC can continuously evaluate available network metrics to determine at least one policy decision for at least one application in the ECP edge DC (Block 701). The policy can be determined by any AI or ML algorithm or combination thereof. The set of policies determined can be for any number of applications, NSCs, NSIs, or similar components that support applications and their services in an ECP edge DC. For each policy that is updated based on the AI or ML model that is generated by the APETC, a set of policy changes are sent to the corresponding local NSC (Block 703). The APETC receives an acknowledgement from each NSC that the policy updates have been received (Block 705). If an acknowledgement is not received, the policy updates may be resent in some embodiments.

The APETC in coordination with the DCA can continuously collect and receive network metrics (e.g., KPIs) from NSCs at the local ECP edge DCs (Block 707). The received network metric information may be aggregated for analysis. All data that is aggregated can be analyzed as there is not anonymized data at the local ECP edge DC, which enables the APETC to generate more detailed local models and policies. The aggregated data can then be analyzed to prepare a model for further updated policy changes (Block 709). The data can be aggregated at differing levels and scope and models for these different scopes can be generated. The data and scope of the data collection can include any sub-division of the region, resources, and components for an ECP edge DC and the associated SP networks.

Figure 8A:
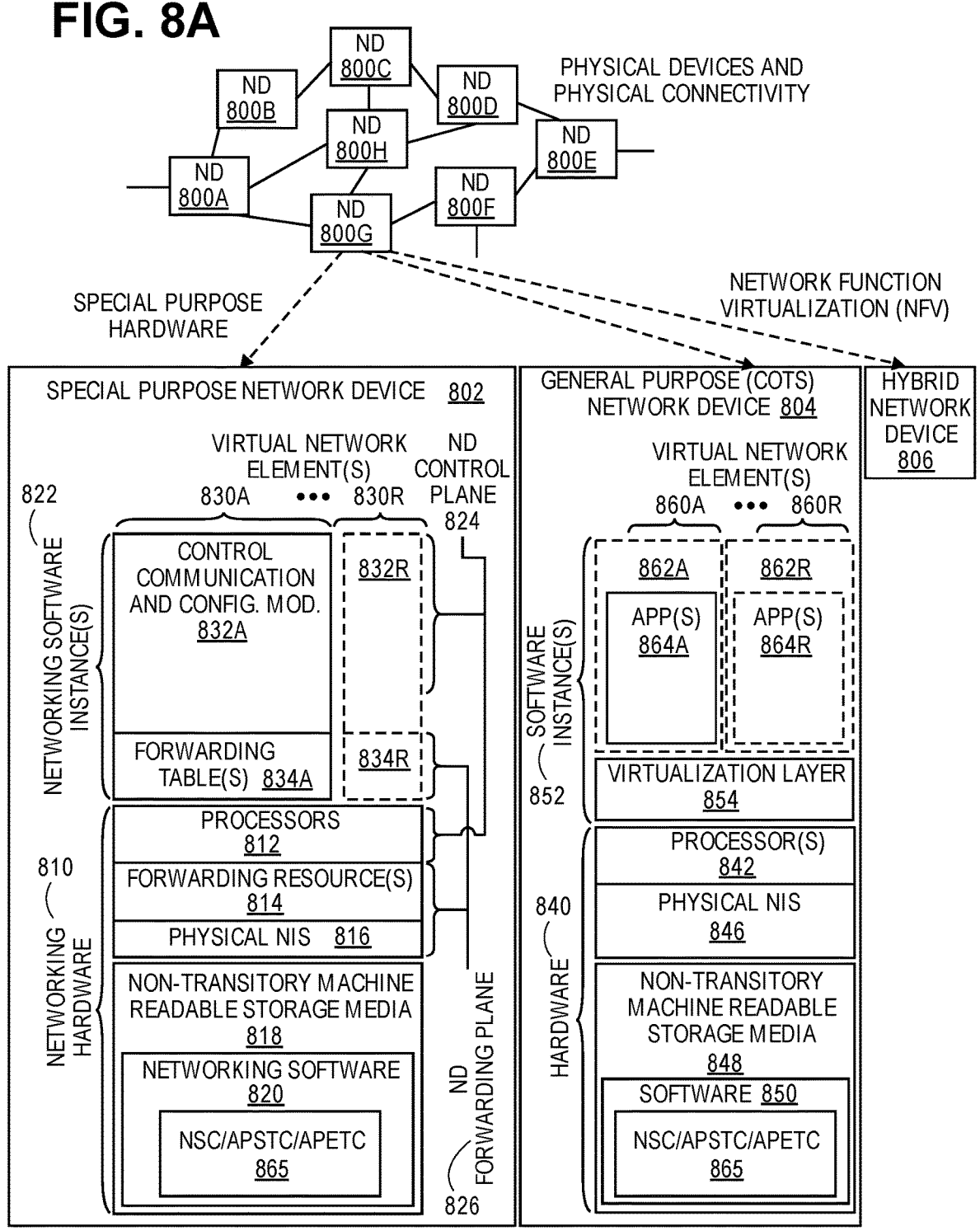
FIG. 8A illustrates connectivity between network devices (NDs) within an exemplary network, as well as three exemplary implementations of the NDs, according to some embodiments of the invention.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising a set of one or more processor(s) 812, forwarding resource(s) 814 (which typically include one or more ASICs and/or network processors), and physical network interfaces (NIs) 816 (through which network connections are made, such as those shown by the connectivity between NDs 800A-H), as well as non-transitory machine readable storage media 818 having stored therein networking software 820. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

In some embodiments, the non-transitory machine-readable medium 818 can also store the NSC/APETC/APSTC 865 or other components described herein. These components can be stored separately or in any combination with other components including the networking software 820. These components can be executed by the processors 812 of the special purpose network device 802.

The special-purpose network device 802 is often physically and/or logically considered to include: 1) a ND control plane 824 (sometimes referred to as a control plane) comprising the processor(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the processor(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
FIG. 8B illustrates an exemplary way to implement a special-purpose network device according to some embodiments of the invention.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and physical NIs 846, as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

In some embodiments, the non-transitory machine-readable medium 848 can also store the NSC/APETC/APSTC 865 or other components described herein. These components can be stored separately or in any combination with other components including the software 850. These components can be executed by the processors 842 of the general purpose network device 804.

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the physical NI(s) 846, as well as optionally between the instances 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
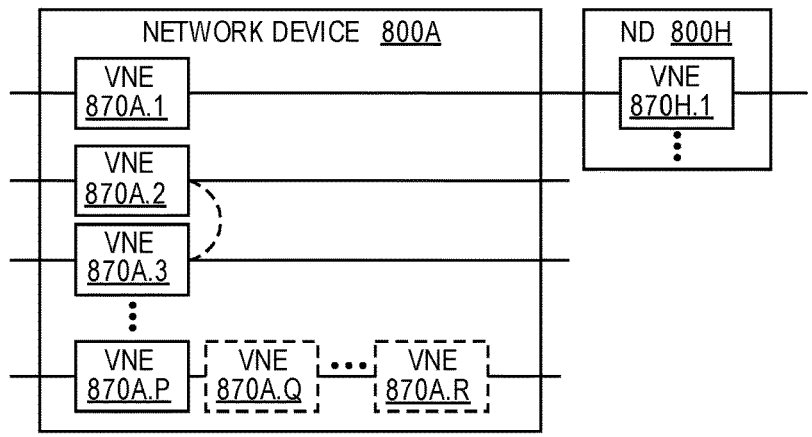
FIG. 8C illustrates various exemplary ways in which virtual network elements (VNEs) may be coupled according to some embodiments of the invention.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service— e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the processor(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
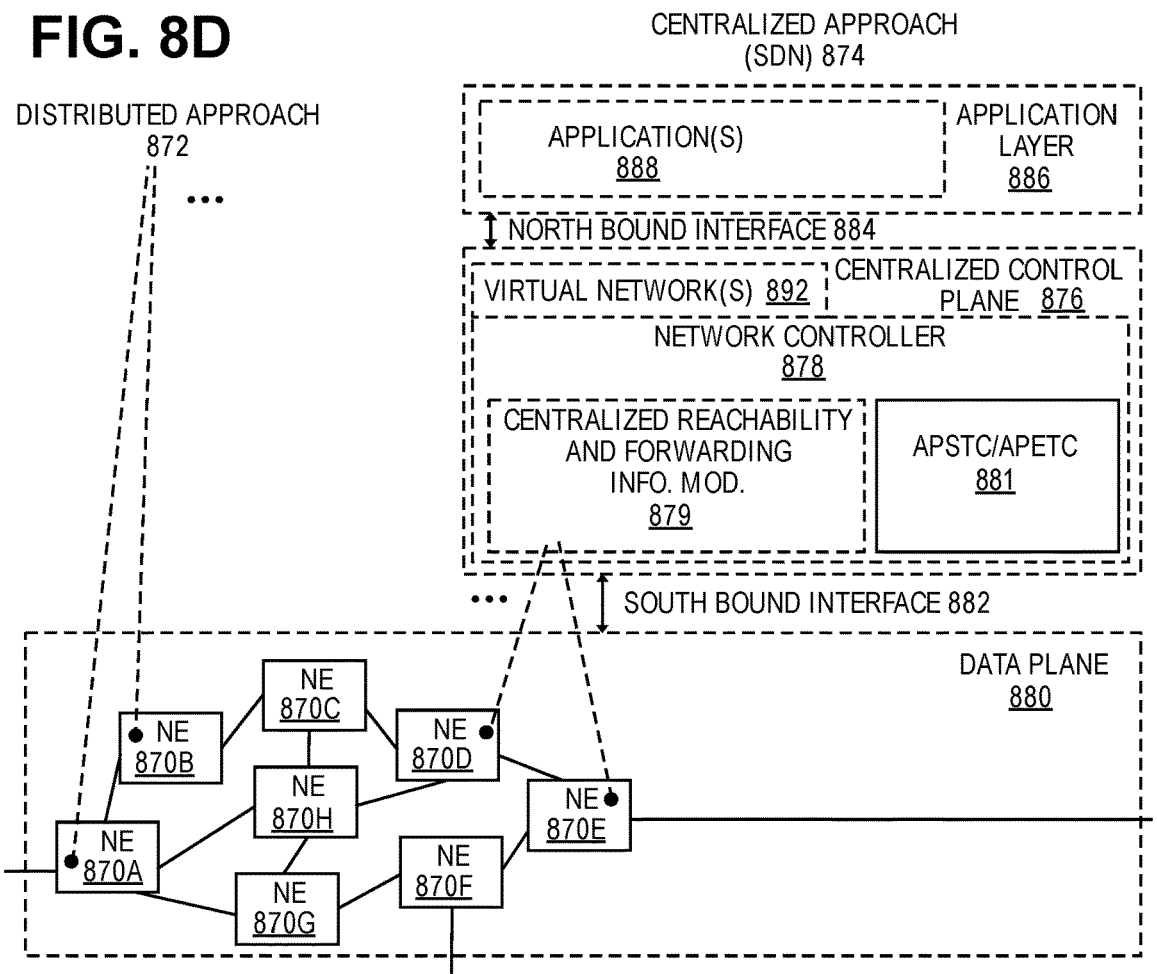
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 870A-H (e.g., the processor(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

In some embodiments, the centralized control plane 876 can also implement the NSC/APETC/APSTC 881 or other components described herein. These components can be stored separately or in any combination with other components including the network controller 878. These components can be executed by processors of the centralized control plane 876.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the processor(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
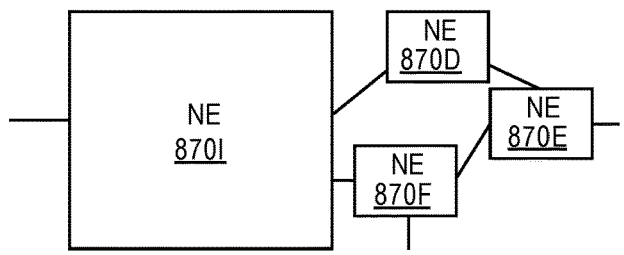
FIG. 8E illustrates the simple case of where each of the NDs implements a single NE, but a centralized control plane has abstracted multiple of the NEs in different NDs into (to represent) a single NE in one of the virtual network(s), according to some embodiments of the invention.
Figure 8F:
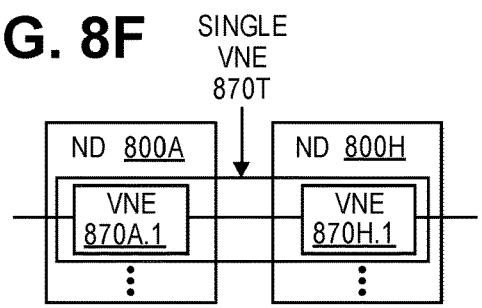
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
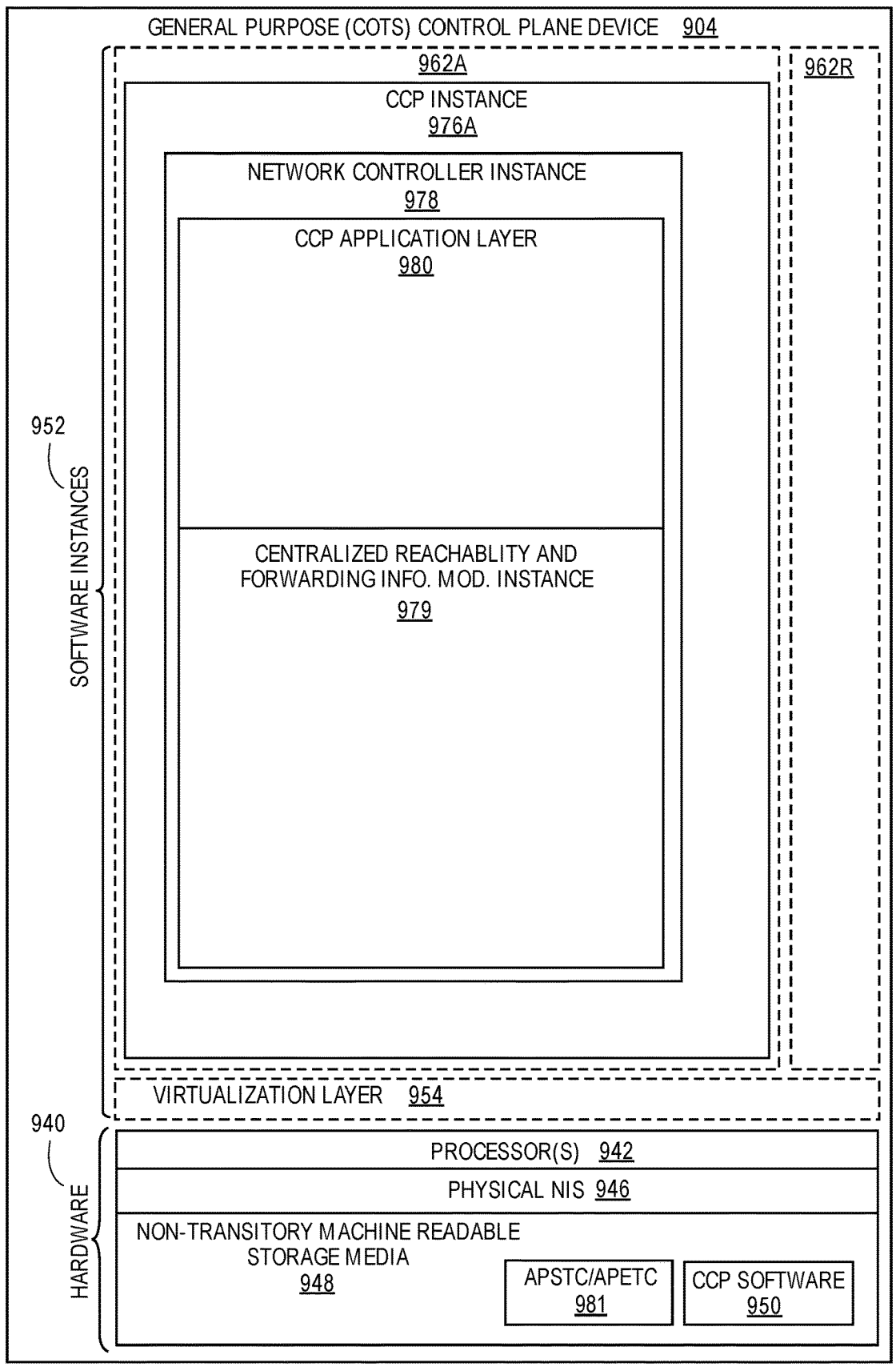
FIG. 9 illustrates a general purpose control plane device with centralized control plane (CCP) software, according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and physical NIs 946, as well as non-transitory machine readable storage media 948 having stored therein centralized control plane (CCP) software 950.

In some embodiments, the non-transitory machine-readable medium 948 can also store the NSC/APETC/APSTC 981 or other components described herein. These components can be stored separately or in any combination with other components including the CCP software 950. These components can be executed by the processors 942 of the control plane device 904.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user-interfaces). At a more abstract level, this CCP application layer 980 within the centralized control plane 876 works with virtual network view(s) (logical view(s) of the network) and the middleware layer provides the conversion from the virtual networks to the physical view.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NEVNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NEVNE implemented on a ND can be referred to as IP addresses of that NEVNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for a network slicing controller (NSC) of an edge cloud platform (ECP) edge data center (DC) to manage network slicing instances associated with the ECP DC, the method comprising:
receiving at least one policy change from an artificial intelligence powered smart traffic controller (APSTC) or an artificial intelligence powered edge traffic controller (APETC), wherein the at least one policy change pertains to resource allocation in a $5^{th}$ Generation (5G) mobile network;
determining whether the at least one policy change is valid based on local monitoring of at least one application with a network slicing instance in a service provider network managed by the NSC; and sending the at least one policy change to a common control network function in the 5G mobile network.

2. The method of claim 1, further comprising:
discarding the at least one policy change in response to determining the at least one policy change is invalid.

3. The method of claim 1, further comprising:
recording a validation decision on the at least one policy change in a data collection point in the ECP DC.

4. The method of claim 1, further comprising:
determining the at least one policy change based on artificial intelligence or machine learning algorithm analysis of network metrics collected for the network slicing instance supporting the at least one application.

5. The method of claim 1, further comprising:
collecting network metrics from the ECP DC for the service provider network; and
analyzing the network metrics to generate an artificial intelligence or machine learning model to produce the at least one policy change.

6. A network device to operate as a network slicing controller (NSC) of an edge cloud platform (ECP) edge data center (DC) to manage network slicing instances associated with the ECP DC, the network device comprising:
a non-transitory computer-readable medium having stored therein instructions for the NSC; and
a processor coupled to the non-transitory computer-readable medium, the processor to execute the NSC, the NSC to receive at least one policy change from an artificial intelligence powered smart traffic controller (APSTC) or an artificial intelligence powered edge traffic controller (APETC), wherein the at least one policy change pertains to resource allocation in a $5^{th}$ Generation (5G) mobile network, to determine whether the at least one policy change is valid based on local monitoring of at least one application with a network slicing instance in a service provider network managed by the NSC, and to send the at least one policy change to a common control network function in the 5G mobile network.

7. The network device of claim 6, wherein the NSC is further to discard the at least one policy change in response to determining the at least one policy change is invalid.

8. The network device of claim 6, wherein the NSC is further to record a validation decision on the at least one policy change in a data collection point in the ECP DC.

9. The network device of claim 6, wherein the non-transitory computer-readable medium stores instructions for the APETC, and wherein the APETC is further to determine the at least one policy change based on artificial intelligence or machine learning algorithm analysis of network metrics collected for the network slicing instance supporting the at least one application.

10. The network device of claim 6, wherein the non-transitory computer-readable medium stores instructions for the APETC, and wherein the APETC is further to collect network metrics from the ECP DC for the service provider network, and analyze the network metrics to generate an artificial intelligence or machine learning model to produce the at least one policy change.

11. A computing device to execute a plurality of virtual machines, the plurality of virtual machines implementing network function virtualization (NFV), the plurality of virtual machines to execute a method for a network slicing controller (NSC) of an edge cloud platform (ECP) edge data center (DC) to manage network slicing instances associated with the ECP DC, the computing device comprising:
a non-transitory computer-readable medium having stored therein instructions for the NSC; and
a processor coupled to the non-transitory computer-readable medium, the processor to execute the plurality of virtual machines, at least one of the plurality of virtual machines to execute the instructions for the NSC, the NSC to receive at least one policy change from an artificial intelligence powered smart traffic controller (APSTC) or an artificial intelligence powered edge traffic controller (APETC), wherein the at least one policy change pertains to resource allocation in a $5^{th}$ Generation (5G) mobile network, to determine whether the at least one policy change is valid based on local monitoring of at least one application with a network slicing instance in a service provider network managed by the NSC, and to send the at least one policy change to a common control network function in the 5G mobile network.

12. The computing device of claim 11, wherein the NSC is further to discard the at least one policy change in response to determining the at least one policy change is invalid.

13. The computing device of claim 11, wherein the NSC is further to record a validation decision on the at least one policy change in a data collection point in the ECP DC.

14. The computing device of claim 11, wherein the non-transitory computer-readable medium stores the instructions for the APETC, and wherein the APETC is further to determine the at least one policy change based on artificial intelligence or machine learning algorithm analysis of network metrics collected for the network slicing instance supporting the at least one application.

15. The computing device of claim 11, wherein the non-transitory computer-readable medium stores the instructions for the APETC, and wherein the APETC is further to collect network metrics from the ECP DC for the service provider network, and analyze the network metrics to generate an artificial intelligence or machine learning model to produce the at least one policy change.

16. A computing device to execute a control plane of a software defined networking (SDN) network, the computing device to implement a method for an artificial intelligence powered smart traffic controller (APSTC), the APSTC to manage network slicing instances an edge cloud platform (ECP) edge data center (DC), the computing device comprising:
a non-transitory computer-readable medium having stored therein instructions for the APSTC; and
a processor coupled to the non-transitory computer-readable medium, the processor to execute instructions for the APSTC, the APSTC to determine at least one policy change for managing the network slicing instances associated with the ECP DC, based on collected network metrics and an artificial intelligence or machine learning model, the APSTC to send the at least one policy change to a network slicing controller (NSC) for the NSC to operate on the at least one policy change, where the at least one policy change pertains to resource allocation in a $5^{th}$ Generation (5G) mobile network and for the NSC to determine whether the at least one policy change is valid based on local monitoring of at least one application with a network slicing instance in a service provider network managed by the NSC, and the APSTC to collect updated network metrics from the ECP DC implementing the NSC to determine whether the at least one policy change is valid based on local monitoring of at least one application with network slicing instance in a service provider network managed by the NSC.

17. The computing device of claim 16, wherein the APSTC is further configured to update the at least one policy change for multiple applications across different locations, to combine policies for different applications at a same location or different locations in ECP DC, or to remove or split a common policy for different applications at a same location or different locations.

18. The computing device of claim 16, wherein APSTC anonymized data is collected from the ECP DC.

19. The computing device of claim 16, wherein the APSTC generates an artificial intelligence model or machine learning model for differing scopes including the ECP DC, edge computing platform region, or a service provider.

20. The computing device of claim 16, wherein the APSTC manages policies in a plurality of ECP DCs via local network slicing controllers.

* * * * *